(12) United States Patent
Ge et al.

(10) Patent No.: US 11,724,611 B2
(45) Date of Patent: Aug. 15, 2023

(54) HIGH-VOLTAGE VEHICLE BUS SYSTEM

(71) Applicant: FORD GLOBAL TECHNOLOGIES, LLC, Dearborn, MI (US)

(72) Inventors: Baoming Ge, Okemos, MI (US); Yantao Song, Northville, MI (US); Lihua Chen, Farmington Hills, MI (US); Serdar Hakki Yonak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/546,514

(22) Filed: Dec. 9, 2021

(65) Prior Publication Data

US 2023/0182594 A1  Jun. 15, 2023

(51) Int. Cl.
| | |
|---|---|
| *H02M 7/797* | (2006.01) |
| *B60L 53/22* | (2019.01) |
| *H02J 3/32* | (2006.01) |
| *H02M 3/335* | (2006.01) |
| *B60L 55/00* | (2019.01) |
| *B60L 50/40* | (2019.01) |
| *H02J 7/00* | (2006.01) |

(52) U.S. Cl.
CPC ............... *B60L 53/22* (2019.02); *B60L 50/40* (2019.02); *B60L 55/00* (2019.02); *H02J 3/322* (2020.01); *H02J 7/0068* (2013.01); *H02M 3/33573* (2021.05); *H02M 3/33584* (2013.01); *B60L 2210/30* (2013.01); *B60L 2210/40* (2013.01); *H02J 2207/20* (2020.01)

(58) Field of Classification Search
CPC ..................................................... B60L 53/22
See application file for complete search history.

(56) References Cited

U.S. PATENT DOCUMENTS

| | | | |
|---|---|---|---|
| 10,358,041 | B2 | 7/2019 | Lee et al. |
| 10,369,896 | B2 | 8/2019 | Namuduri et al. |
| 10,589,633 | B2 | 3/2020 | Layden et al. |
| 10,992,233 | B2* | 4/2021 | Dincan .................. H02M 3/01 |
| 2016/0190944 | A1* | 6/2016 | Uchihara .......... H02M 3/33561 363/17 |
| 2020/0068694 | A1* | 2/2020 | Ishiyama ............ H02M 3/1588 |
| 2022/0109381 | A1* | 4/2022 | Yenduri .............. H02M 7/4815 |

* cited by examiner

*Primary Examiner* — Jared Fureman
*Assistant Examiner* — Esayas G Yeshaw
(74) *Attorney, Agent, or Firm* — David B Kelley; Brooks Kushman P.C.

(57) ABSTRACT

A power converter includes a plurality of switches, a transformer electrically connected between some and other of the switches, and a plurality of series connected capacitors electrically connected between the switches and an output of the power converter. A controller operates the switches such that a voltage at an input of the power converter and across each of the capacitors is same and a voltage at the output is double the voltage at the input.

16 Claims, 6 Drawing Sheets

HIGH-VOLTAGE VEHICLE BUS SYSTEM

TECHNICAL FIELD

The present disclosure relates to a vehicle system having a high-voltage bus.

BACKGROUND

Battery electric vehicles (BEVs) rely on a high-voltage (HV) battery for power supply. Currently, 400V HV batteries and DC buses are commonly used in various BEVs. An increased HV battery voltage may improve the efficiency of the BEVs.

SUMMARY

A vehicle power system includes a power converter defining an input that receives power from a charger and an output that provides power to a traction battery. The power converter includes a plurality of switches, a transformer electrically connected between some and other of the switches, and a plurality of series connected capacitors electrically connected between the switches and the output. The vehicle power system also includes a controller that operates the switches such that a voltage at the input and across each of the capacitors is same and a voltage at the output is double the voltage at the input.

A vehicle includes a battery, an electric machine connected to the battery via a battery bus associated with a first voltage, a charger connected to the battery bus via a charger bus associated with a second voltage less than the first voltage, and a power converter connected between the battery bus and the charge bus. The power converter includes a transformer having a primary side connected to the charger and a secondary side connected to the battery, a first capacitor and a second capacitor connected in series between the drive bus on the secondary side, a third capacitor connected between the charge bus on the primary side, a plurality of switches on both the primary and secondary sides, and a controller. The controller operates the switches such that a voltage across the first capacitor and a voltage across the second capacitor are equal.

A method of operating a vehicle power converter includes operating a plurality of switches of the vehicle power converter such that a voltage at an input of the vehicle power converter and a voltage across each of a plurality of series connected capacitors defining an output of the vehicle power converter are same, and a voltage at the output is double the voltage at the input.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
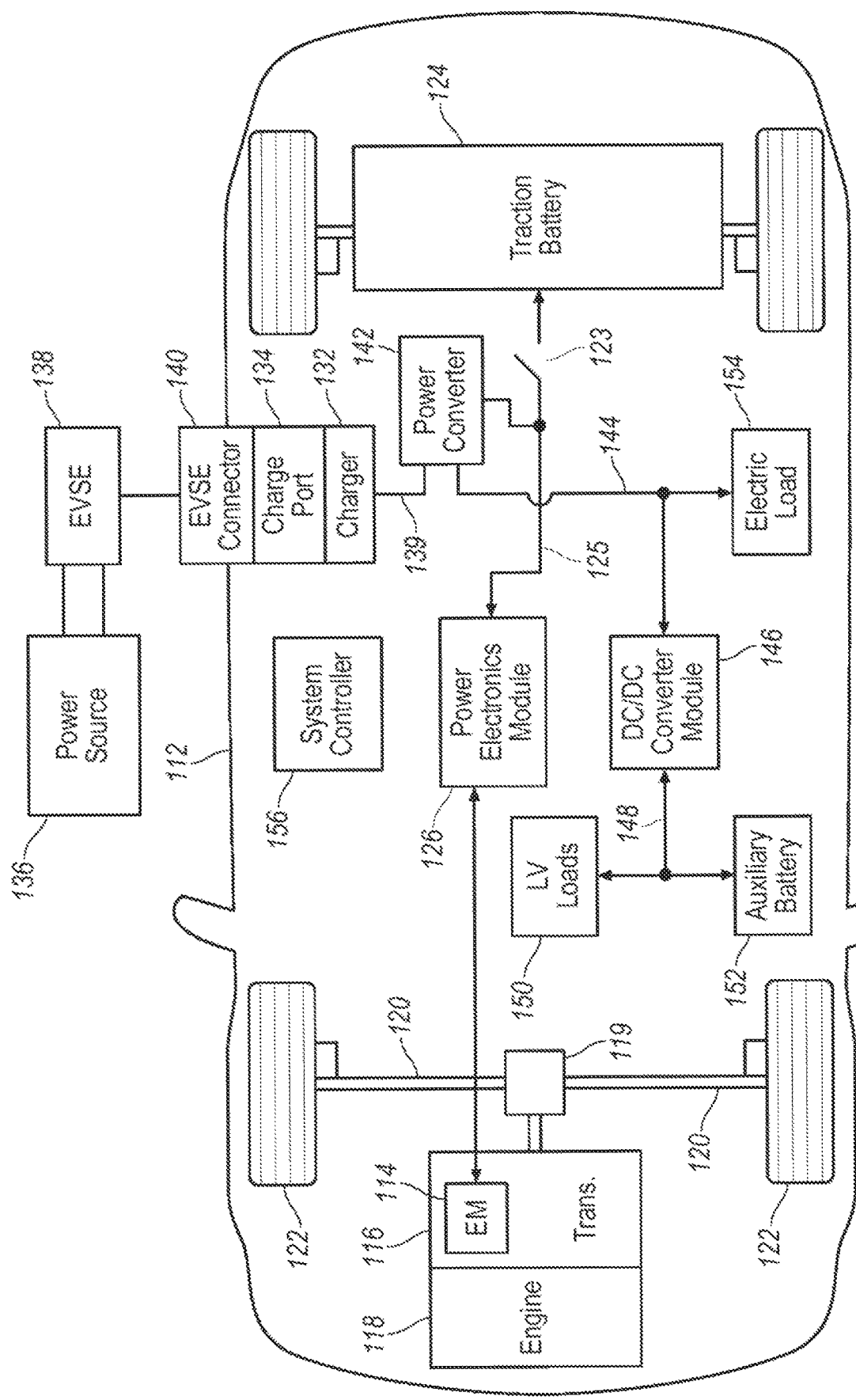
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 may be mechanically coupled to a differential 119 that is configured to adjust the speed of drive shafts 120 that are mechanically coupled to drive wheels 122 of the vehicle 112. The drive shafts 120 may be referred to as the drive axle. In some configurations, a clutch may be disposed between the hybrid transmission 116 and the differential 119. The electric machines 114 can provide propulsion and slowing capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A battery pack or traction battery 124 stores energy that can be used by the electric machines 114. The traction battery 124 may provide a high voltage direct current (DC) output. A contactor module 123 may include one or more contactors configured to isolate the traction battery 124 from a high-voltage drive bus 125 (a.k.a. high-voltage battery bus) when opened and connect the traction battery 124 to the high-voltage drive bus 125 when closed. The high-voltage drive bus 125 may include power and return conductors for carrying current over the high-voltage drive bus 125. The contactor module 123 may be located in the traction battery 124. One or more power electronics modules 126 may be electrically coupled to the high-voltage drive bus 125. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board charger 132. The charger 132 may condition the power supplied from the EVSE 138 to provide the proper voltage and current levels to the traction battery 124 via a high-voltage charger bus 139. The power on the charger bus 139 may be converted via a power converter 142 (to be described in details below) and provided to the high-voltage drive bus 125 to charge the traction battery 124. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

The power converter 142 may interface with the high-voltage charger bus 139, and a high-voltage vehicle utility bus 144 having a different voltage from the high-voltage drive bus 125. As an example, the traction battery 124 and the high-voltage drive bus 125 be associated with an 800V voltage, while the charger bus 139 and the utility bus 144 may be associated with only 400V bus. The multiple-voltage bus configuration may be advantageous as the higher voltage on the drive bus 125 may increase the efficiency of the vehicle battery and drivetrain, and the lower voltage on the charger bus 139 and the utility bus 144 may improve EVSE compatibilities and reduce manufacturing expense by using lower voltage compatible components and devices. It is noted that the specific voltages on the drive bus 125 and utility bus 144 discussed in the present disclosure are merely examples for demonstrative purposes and the present disclosure is not limited to any specific voltage. The power converter 142 may be configured to convert voltages and transfer power between the drive bus 125 and the utility bus 144 in adaptation to various situations. The traction battery 124 may provide energy for other vehicle electrical systems connected to the utility bus 144 via the power converter 142. The vehicle 112 may include a DC/DC converter module 146 that converts the high voltage DC output from the high-voltage utility bus 144 to a low-voltage DC level of a low-voltage bus 148 that is compatible with low-voltage loads 150. An output of the DC/DC converter module 146 may be electrically coupled to an auxiliary battery 152 (e.g., 12V battery) for charging the auxiliary battery 152. The low-voltage loads 150 may be electrically coupled to the auxiliary battery 152 via the low-voltage bus 148. One or more high-voltage electrical loads 154 (a.k.a. utility load, vehicle load) may be coupled to the high-voltage utility bus 144. The high-voltage electrical loads 154 may have an associated controller that operates and controls the high-voltage electrical loads 154 when appropriate. Examples of high-voltage electrical loads 154 may be a fan, an electric heating element, and/or an air-conditioning compressor.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by the Institute of Electrical and Electronics Engineers (IEEE) 802 family of standards. Additional channels of the vehicle network may include discrete connections between modules and may include power signals from the auxiliary battery 152. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 156 may be present to coordinate the operation of the various components. Note that operations and procedures that are described herein may be implemented in one or more controllers. Implementation of features that may be described as being implemented by a particular controller is not necessarily limited to implementation by that particular controller. Functions may be distributed among multiple controllers communicating via the vehicle network.

Figure 2:
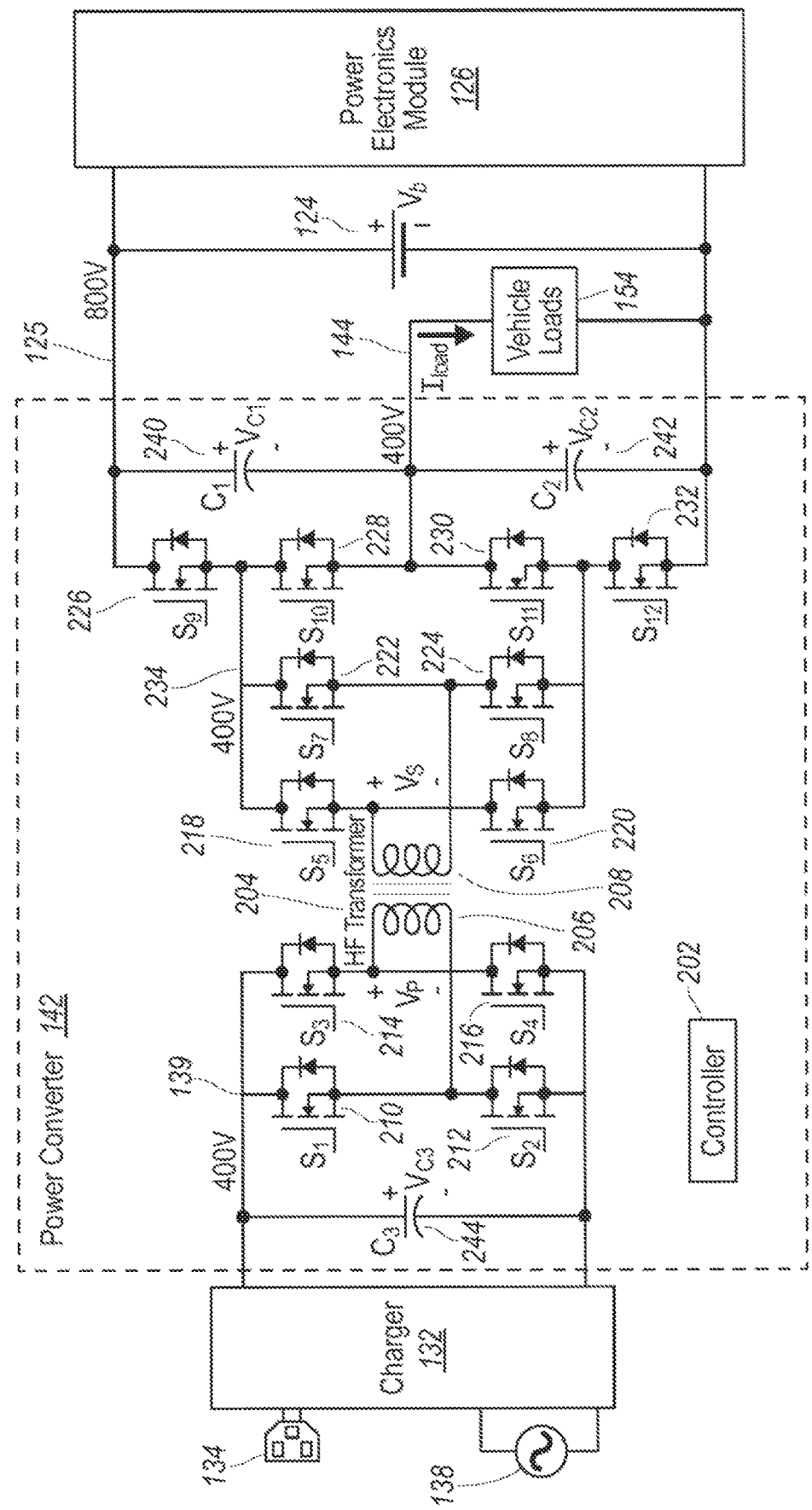
FIG. 2 depicts an example circuit diagram for a power converter.

Referring to FIG. 2, an example circuit diagram 200 depicting the power converter 142 is illustrated. With continuing reference to FIG. 1, the power converter 142 is connected between the charger 132 associated with a first voltage on the charger bus 139 and the traction battery 124 associated with a second voltage on the drive bus 125. In the present example, the first voltage on the charger bus 139 is 400V and the second voltage on the drive bus 125 is 800V. In addition, the voltage on the utility bus 144 for the vehicle loads 154 is 400V in the present example. The power converter 142 may include one or more power electronics controllers 202 configured to monitor and control the power converter 142. The controller 200 may be configured to adjust the voltage and current output of the power converter 142 a predetermined switching frequency based on feedback indicative of the operating status of the power converter 142.

The power converter 142 may include a high-frequency power transformer having a primary winding 206 and a secondary winding 208 magnetically coupled to each other. The transformer winding voltage ratio of the primary and secondary winding (e.g. Vp, Vs) may be directly proportional to the winding turns ratio of the windings 206 and 208. In the present disclosure, the winding turns ratio between the primary 206 and secondary winding 208 is 1:1. Therefore, the voltage on the primary winding 206 Vp is equal to the voltage on the secondary winding 208 Vs. The primary side of the power converter 142 may include a switching circuitry that includes a plurality of switching devices 210, 212, 214, 216 (a.k.a. primary H-bridge switches). The switching devices may be metal—oxide—semiconductor field-effect transistors (MOSFETs), Insulated Gate Bipolar Junction Transistors (IGBTs) or other solid-state switching devices. The switching devices may be configured to selectively couple a positive terminal and a negative terminal of the charger bus 139 to the primary winding 206. The secondary side of the power converter 142 may include a switching circuitry that includes a plurality of switching devices 218, 220, 222, 224, 226, 228, 230, 232. The switching devices 218, 220, 222, 224 may be referred to as secondary H-bridge switches, and switching devices 226, 228, 230, 232 may be referred to as charging switches. The switching devices may be configured to selectively couple a positive terminal and a negative terminal of a secondary bus 234 to the secondary winding 208. Each of the switching devices within the circuitry may have an associated diode connected in parallel to provide a path for inductive current when the switching device is in non-conducting state. Each of the switching devices may have a control terminal for controller operation of the associated switching device. The control terminals may be electrically coupled to the power electronics controller 202. The power electronics controller 202 may include associated circuitry to drive and monitor the control terminals. For example, the control terminals may be coupled to the gate input of the solid-state switching devices.

On the primary winding side of the high-frequency transformer 204, a first switching device 210 may selectively couple the charge bus positive terminal to a negative terminal of the primary winding 206. A first diode may be coupled in parallel to the first switching device 210. A second switching device 212 may selectively couple the charge bus negative terminal to the negative terminal of the primary winding 206. A second diode may be coupled in parallel to the second switching device 212. A third switching device 214 may selectively couple the charge bus positive terminal to a positive terminal of the primary winding 206. A third diode may be coupled in parallel to the third switching device 214. A fourth switching device 216 may selectively couple the charge bus negative terminal to the positive terminal of the primary winding 206. A fourth diode may be coupled in parallel to the fourth switching device 216. On the negative winding side of the high-frequency transformer 204, a fifth switching device 218 may selectively couple the secondary bus positive terminal to a positive terminal of the secondary winding 208. A fifth diode may be coupled in parallel to the fifth switching device 218. A sixth switching device 220 may selectively couple the secondary bus negative terminal to the positive terminal of the secondary winding 208. A sixth diode may be coupled in parallel to the sixth switching device 220. A seventh switching device 222 may selectively couple the secondary bus positive terminal to a negative terminal of the secondary winding 208. A seventh diode may be coupled in parallel to the seventh switching device 222. An eighth switching device 224 may selectively couple the secondary bus negative terminal to a negative terminal of the secondary winding 208. An eighth diode may be coupled in parallel to the eighth switching device 224. A nineth switching device 226 may selectively couple the drive bus positive terminal to the secondary bus positive terminal. A nineth diode may be coupled in parallel to the nineth switching device 226. A tenth switching device 228 may selectively couple the utility bus positive terminal to the secondary bus positive terminal. A tenth diode may be coupled in parallel to the tenth switching device 228. An eleventh switching device 230 may selectively couple the utility bus positive terminal to the secondary bus negative terminal. An eleventh diode may be coupled in parallel to the eleventh switching device 230. A twelfth switching device 232 may selectively couple the utility bus negative terminal to the secondary bus negative terminal. A twelfth diode may be coupled in parallel to the twelfth switching device 232.

The power converter 142 may further include one or more capacitors connected across various buses on both the primary and secondary winding sides. In the present example, a first capacitor 240 is connected across the drive bus positive terminal and the utility bus positive terminal to maintain the voltage drop between the terminals. A second capacitor 242 is connected across the utility bus 144 to maintain the voltage drop between the positive and negative terminals of the utility bus 144. A third capacitor 244 is connected across the charge bus 139 to maintain the voltage drop between the positive and negative terminals of the charge bus 139. Although each of the first, second and third capacitors 240, 242, 244 is illustrated as a single capacitor in FIG. 2, it is noted that the present disclosure is not limited thereto and each of the first, second and third capacitors 240, 242, 244 may include a plurality of capacitors under various configurations. In the present example, each of the first, second and third capacitors 240, 242, 244 is configured to maintain a 400V voltage drop across its respective terminals. Since the first capacitor 240 and the second capacitor 242 are connected in series across the drive bus 125, the voltage drop across the positive terminal and the negative terminal of the drive bus 125 is 800V. However, due to the configuration of the circuit, the 800V voltage is not directly applied to any one of the switching devices. Instead, the 400V voltage is applied to between the two terminals of each single switching device. Due to the reduced voltage, lower voltage rating transistors may be used for switching devices in the present example. As an example, each switching device in the present example illustrated in FIG. 2 may be associated with a maximum voltage rate of 600V. The power converter 142 may be configured to adaptively operate the switches to maintain the predefined voltage across various buses. The control terminals of the switching devices may be driven with Pulse Width Modulated (PWM) signals to control the voltage and power of the power converter 142.

Figure 3:
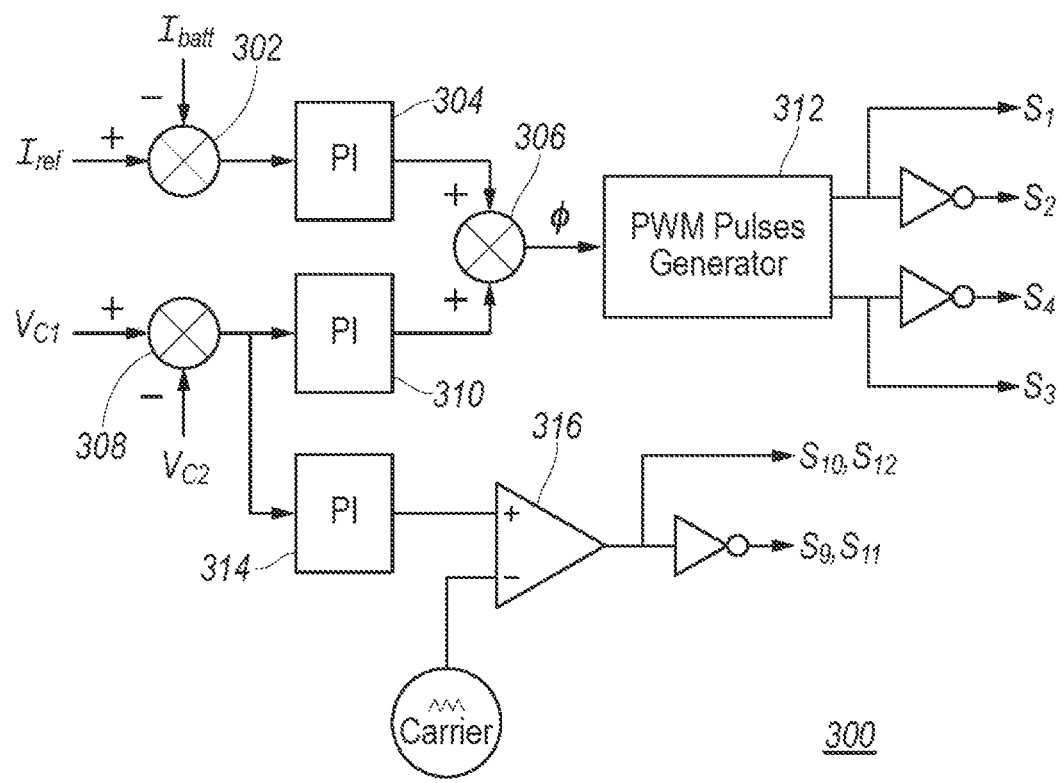
FIG. 3 depicts a control scheme diagram.

Referring to FIG. 3, a control scheme diagram 300 of one embodiment of the present disclosure is illustrated. The control scheme 300 may be a closed loop scheme to operate the power converter 142 during a charging process. Additionally, the control scheme 300 may also be applied to operate the power converter 142 during a vehicle-to-grid (V2G) or on-board generator (OBG) process under essentially the similar concept. The control scheme 300 may be implemented via the controller 202 in the present example. As illustrated in FIG. 3, the control scheme 300 relies on feedback including battery current $I_{batt}$, voltages across the first and second capacitors $V_{C1}$ and $V_{C2}$ to control the operations of the primary H-bridge switching devices 210, 212, 214, 216 on the primary winding side of the power converter 142. The battery current (e.g. charging current, or output current depending on the using scenario) $I_{batt}$ is compared with a references current $I_{ref}$ via a first summing point 302, and the result indicative of a current deviation from the reference current $I_{ref}$ is output to a first proportional integral regulator (PIR, a.k.a. proportional integral derivative controller) for further processing. The PIR 304 is configured to calculate an error value as the difference between a desired setpoint and a measured value and applies a correction based on proportional, integral, and/or derivative terms to apply a correction to the control variable. The output of the PIR is sent to a second summing point. On the other branch of the control scheme 300, voltages across the first capacitor 240 and the second capacitor 242 are compared at a third summing point 308, the result indicative of a voltage difference is output to a second PIR 310 for error corrections. The PIR 310 outputs the corrected control variable to the second summing point 306. Having received both the corrected control variable from current deviation and the corrected control variable from voltage difference as inputs, the second summing point 306 processes the inputs to determine a phase shift angle Φ indicative of a phase shift between a positive terminal and a negative terminal of the primary winding 206. The phase shift angle Φ determines the voltage and current output to the primary winding 206. Therefore, the transmission power of the high frequency transformer 204 depends on the phase shift angle Φ. A PWM pulses generator 312 generates control signals for the primary H-bridge switching devices 210, 212, 214, 216 on the primary winding side using the phase shift angle Φ as the input. As illustrated on the bottom part in FIG. 3, control signals for the charging switching devices 226, 228, 230, 232 on the secondary winding side of the power converter 142 are calculated using the voltage difference between the first and second capacitors $V_{C1}$ and $V_{C2}$. The difference is process via a third PIR 314 and the corrected control variable from voltage difference is output to comparator 316 for comparison with a triangular carrier wave. In the present example, when value of the corrected control variable from voltage difference is greater than the value of the carrier wave, the switching devices 228 and 232 are activated to connect the second capacitor 242 to the secondary bus 234. When value of the corrected control variable from voltage difference is less than the value of the carrier wave, the switching devices 226 and 230 are activated to connect the first capacitor 240 to the secondary bus 234. In the vehicle charging mode, the switching devices 218, 220, 222, 224 operates as a rectifier to convert the AC current from the secondary winding 208 into a DC current on the secondary bus 234.

The control scheme 300 may be applied to various situations. For instance, in a charging mode in which the power converter 142 is configured to transfer electric power from the EVSE 138 to the traction battery 124, the high-frequency transformer 204 transfers power from the primary winding 206 to the secondary winding 208. The controller 202 operates the primary H-bridge switching devices 210, 212, 214, 216 to open and close at a predetermined frequency and phase shift angle Φ to convert the DC power (e.g. 400V) on the charger bus 139 into AC power to charge the primary winding 206 of the high-frequency transformer 204 which in turn generates a corresponding AC power on the secondary winding 208. The controller 202 operates the secondary H-bridge switching devices 218, 220, 222, 224 as a rectifier to convert the AC power into a DC power to charge the secondary bus 234. The controller 202 operates the charging switching devices 226, 228, 230, 232 to equally distribute the voltage to the first and second capacitors 240, 242. In the present example, since second capacitor 242 is also configured to maintain the voltage across the vehicle load 154, the duty cycle for the charging switching devices 226, 228, 230, 232 may be adjusted to balance the voltage.

Figure 4:
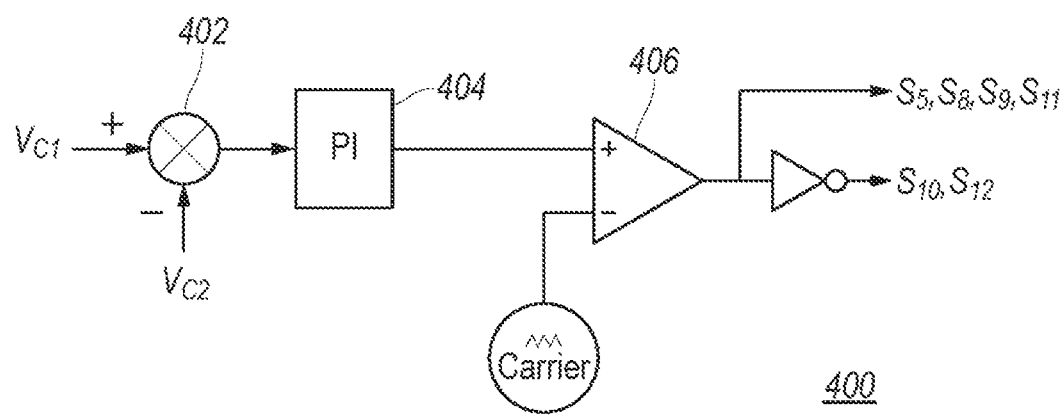
FIG. 4 depicts another control scheme diagram.
Figure 5A:
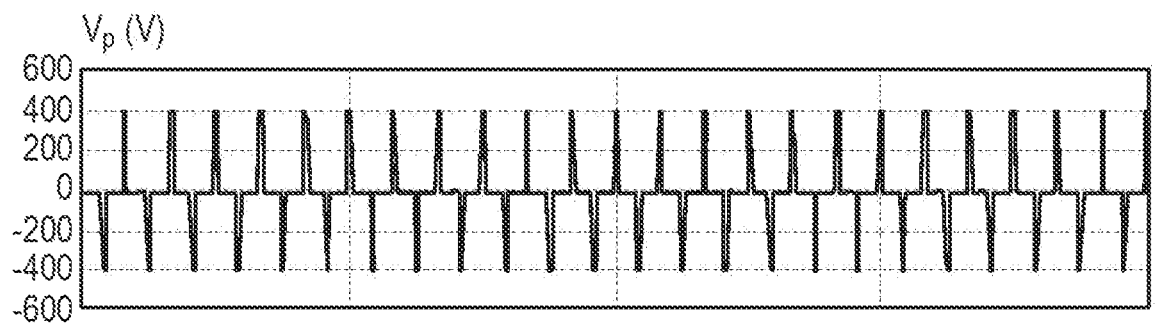
FIGS. 5A-5D depict waveform diagrams of a charging control scheme.
Figure 5B:
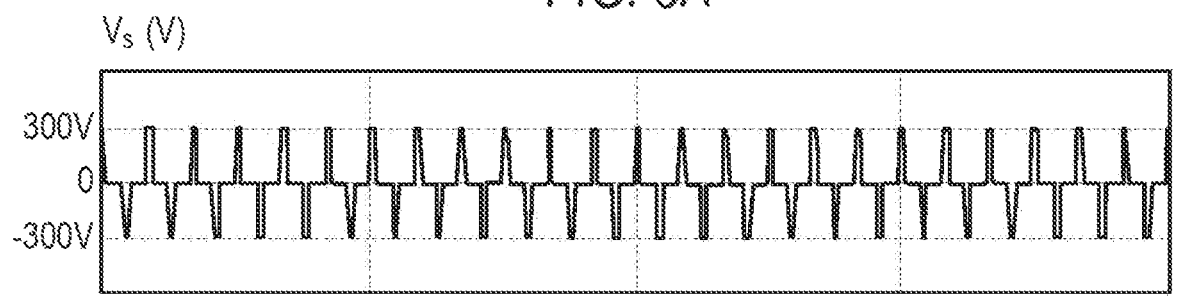
Figure 5C:
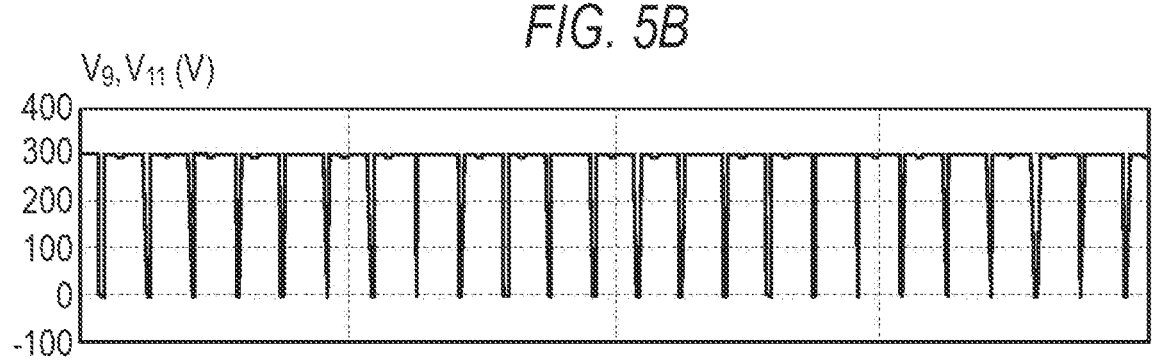
Figure 5D:
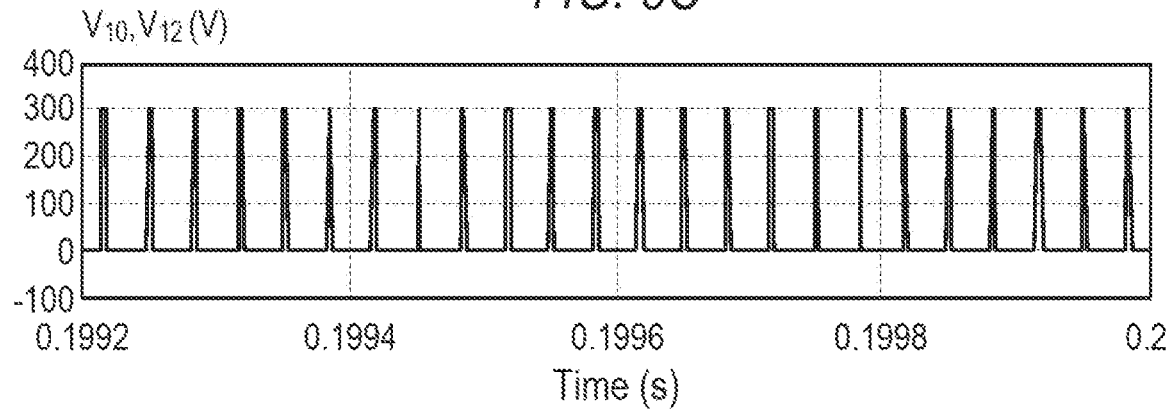
Figure 6A:
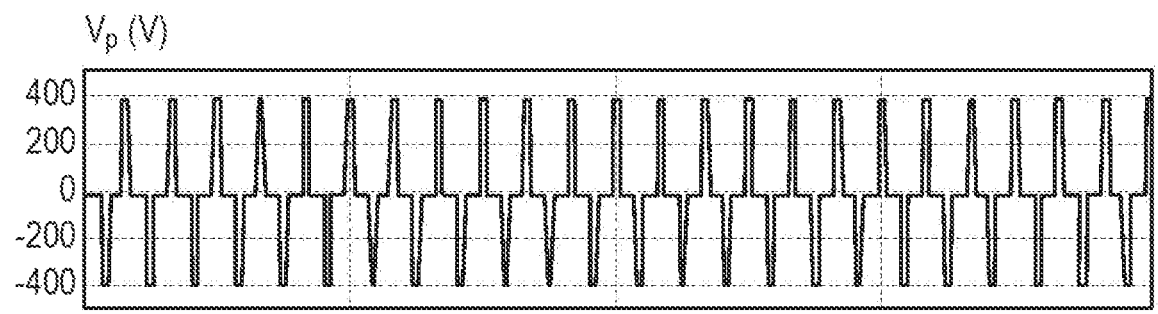
FIGS. 6A-6D depict waveform diagrams of a vehicle-to-grid control scheme.
Figure 6B:
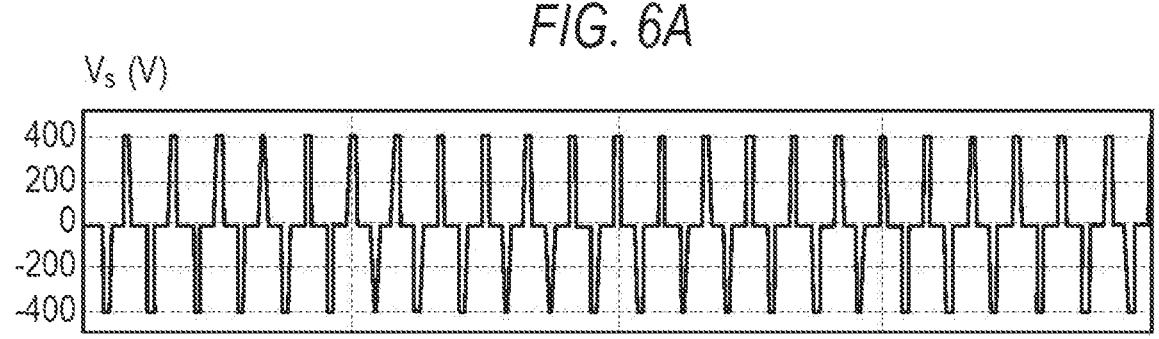
Figure 6C:
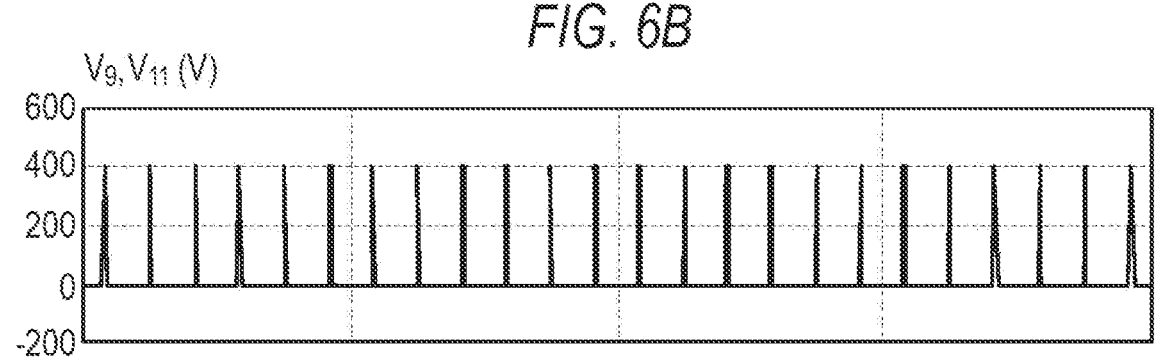
Figure 6D:
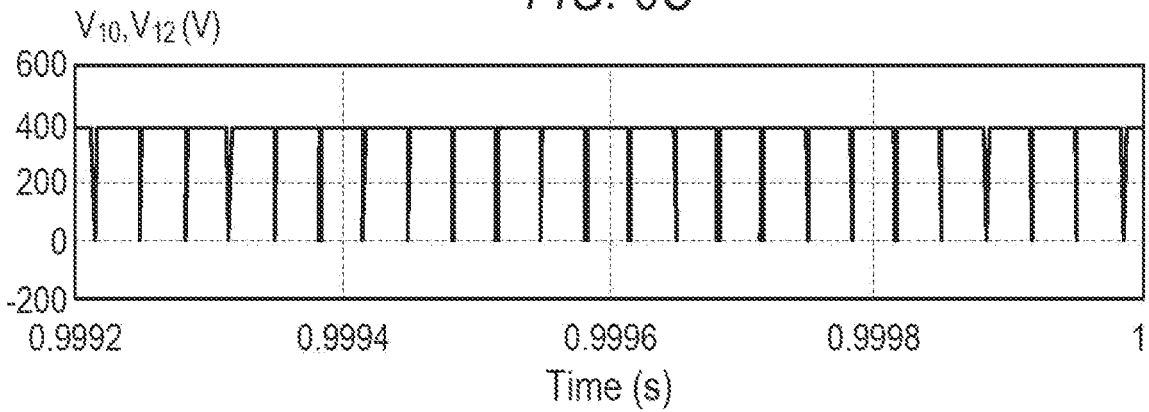

Referring to FIGS. 5A-5D, waveform diagrams of a charging control scheme are illustrated. With continuing reference to FIGS. 1-4, the vehicle traction battery voltage is 600V in the present example. Since the first and second capacitors 240, 242 equally splits the 600V on the drive bus 125, each capacitor maintains a 300V voltage. Therefore, the voltage on the secondary bus 234 is also 300V. In the present example, the voltage on the charge bus 139 received from the EVSE 138 may still be 400V. The transformer 204 may be configured to convert the 400V current on the primary winding 206 into a 300V current on the secondary winding 208 with appropriate turn ratio (e.g. 4:3). Alternatively, in case that the transformer winding having a fix turn ratio 1:1, the transformer 204 may still work at a minor loss. As illustrated with reference to FIGS. 5A and 5B, the voltage on the primary winding 206 Vp has a peak value of +/−400V and the voltage on the secondary winding 208 Vs has a peak value of +/−300V. The duty cycle of the peak values on the primary winding 206 may be adjusted by the phase shift angle Φ such that the charging power on the secondary winding 208 may be adjusted as needed. In the present example the switching frequency on the high-frequency transformer 204 is 30 kHz. The vehicle load is 25A in current and 7.5 kW in power. The battery charging current is 85 A and 51 kW in power. Due to the vehicle load connected in parallel to the second capacitor 242, the controller 202 needs to adjust the duty cycle of the charging switching devices 226, 228, 230, 232 to charge the second capacitor 242 more often than the first capacitor 240. Referring to FIGS. 5C and 5D, it can be seen that the switching devices 228, 232 the charging the second capacitor 242 is operated as a higher duty cycle compared with the switching devices 226, 230 charging the first capacitor 240 (zero voltage across the switching devices indicates a closed status).

Similarly, in the V2G mode, the power converter 142 operates in the reversed direction by transferring power from the traction battery 124 and/or the power electronics module 126 to the power grid via the charger 132. Referring to FIGS. 6A-6D, waveform diagrams of a V2G control scheme are illustrated. In this example, the battery voltage is 800V and the voltage on the secondary bus 234 is 400V. The high-frequency transformer 204 having a 1:1 turn ratio and switching at 30 kHz frequency is configured to transfer the battery power on the secondary bus 234 to the primary bus 139 to supply to the power grid. As illustrated with reference to FIGS. 6B and 6A, the voltage on the secondary winding 208 Vs has a peak value of +/−400V and the voltage on the primary winding 206 Vp has a peak value around +/−390V. In this example, the vehicle load 154 draws a 25 A current (i.e. 10 KW) and the V2G power output is 15.2 kW. Even though the second capacitor 242 provides a 25 A current to the vehicle loads 154, the first and second capacitors 240, 242 maintains the same voltage of 400V under the voltage balance control as illustrated with reference to FIGS. 6C and 6D.

Referring to FIG. 4, a control scheme diagram 400 of another embodiment of the present disclosure is illustrated. The control scheme 400 may be a closed loop scheme to operate the power converter 142 during a driving mode in which the traction battery 124 supplies electric power to the electric machine 114 via the power electronics module 126. In the driving mode, the primary H-bridge switching devices 210, 212, 214, 216 and two of the secondary H-bridge switching devices 220, 222 are turned off (i.e. open) as no power is to be transferred to the charger 132. Operations of the other two secondary H-bridge switching devices 218, 224 and the charging switching devices 226, 228, 230, 232 are controlled via the control scheme 400 to maintain the same voltage across the first and second capacitors 240, 242. The voltages across the first capacitor 240 and the second capacitor 242 are compared at a first summing point 402. The result indicative of a voltage difference is output to a first PIR 404 for error corrections and the corrected control variable from voltage difference is output to a comparator 406 for comparison with a triangular carrier wave. In the present example, when value of the corrected control variable from voltage difference is greater than the value of the carrier wave, the switching devices 218, 224, 226 230 are activated. When value of the corrected control variable from voltage difference is less than the value of the carrier wave, the switching devices 228, 232 are activated.

Figure 7A:
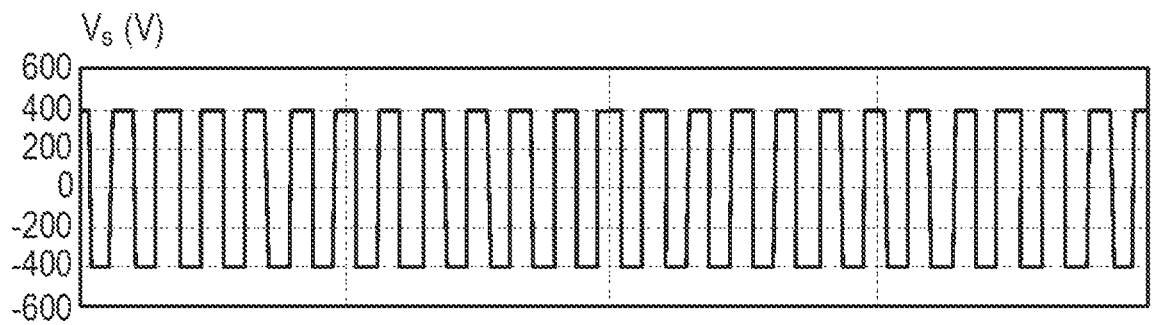
FIGS. 7A-7D depict waveform diagrams of a vehicle driving control scheme.
Figure 7B:
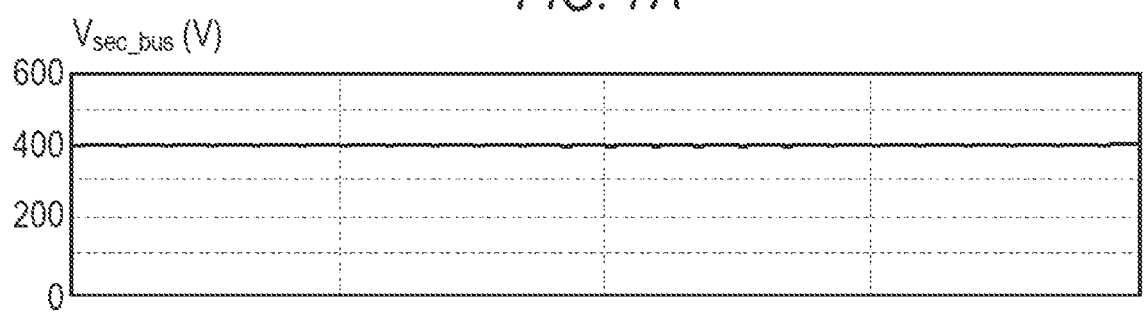
Figure 7C:
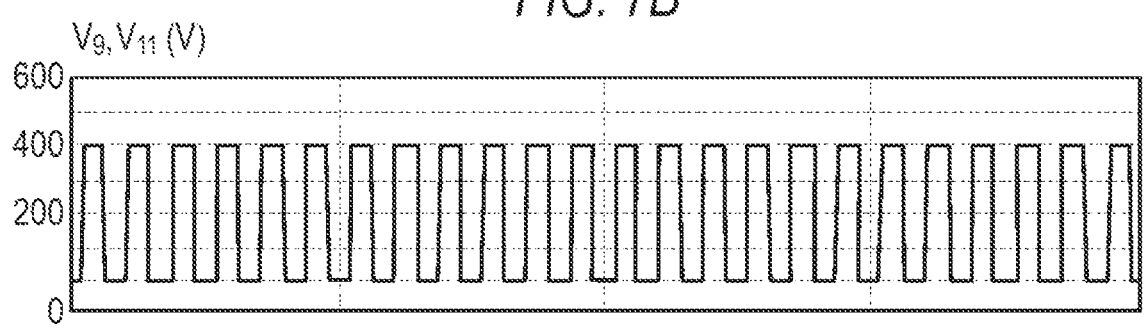
Figure 7D:
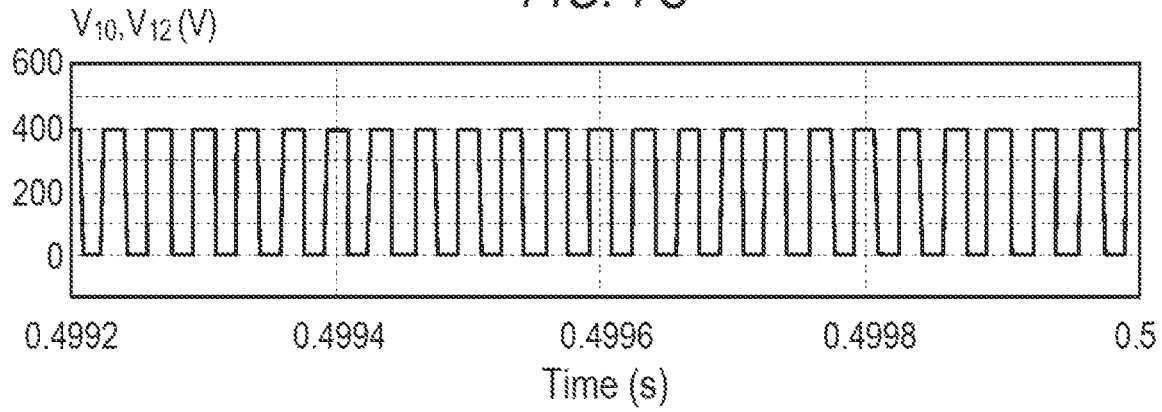

Referring to FIGS. 7A-7D, waveform diagrams of a vehicle driving control scheme are illustrated. In the present example, the traction battery 124 operates at an 800V voltage and the vehicle load 154 is 10 kW. The electric machine 114 consumes a 200 A current (i.e. 160 kW). In the present example, since the switching devices 210, 212, 214, 216 220, 222 are turned off, the voltage across the secondary winding 208 toggles between +400V and −400V resembling a square waveform at the predetermined switching frequency and the voltage on the secondary bus 234 is maintained at 400V as illustrated with reference to FIGS. 7A and 7B. FIGS. 7C and 7D illustrate voltage waveforms of the switching devices 226, 230 and switching devices 228, 232 respectively.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to expense, strength, durability, life cycle expense, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle power system comprising:
    a power converter defining an input configured to receive power from a charger and an output configured to provide power to a traction battery, and including a plurality of switches, a transformer electrically connected between some and other of the switches, and a plurality of series connected capacitors electrically connected between the switches and the output; and
    a controller programmed to operate the switches such that a voltage at the input and across each of the capacitors is same and a voltage at the output is double the voltage at the input.

2. The vehicle power system of claim 1, wherein the some of the switches defines a DC to AC converter.

3. The vehicle power system of claim 1, wherein the other of the switches defines an AC to DC converter.

4. The vehicle power system of claim 3, wherein the other of the switches are eight switches and wherein four of the eight are series connected.

5. The vehicle of power system of claim 4, wherein the four and the capacitors are parallel connected.

6. The vehicle power system of claim 1, wherein the capacitors are two capacitors.

7. The vehicle power system of claim of claim 1, wherein the voltage at the output is 800 volts.

8. A vehicle, comprising:
    a battery;
    an electric machine connected to the battery via a battery bus associated with a first voltage;
    a charger connected to the battery bus via a charger bus associated with a second voltage less than the first voltage; and
    a power converter connected between the battery bus and the charge bus, including
        a transformer having a primary side connected to the charger and a secondary side connected to the battery,
        a first capacitor and a second capacitor connected in series between the drive bus on the secondary side,
        a third capacitor connected between the charge bus on the primary side,
        a plurality of switches on both the primary and secondary sides, and
        a controller programmed to operate the switches such that a voltage across the first capacitor and a voltage across the second capacitor are equal.

9. The vehicle of claim 8 further comprising a utility bus connected in parallel to the second capacitor.

10. The vehicle of claim 8, wherein the plurality of switches includes
    primary H-bridge switches configured to selectively connect a primary winding of the transformer to the charger bus,
    secondary H-bridge switches configured to selectively connect a secondary winding of the transformer to a secondary bus, and
    charger switches configured to selectively connect the first and second capacitors to the secondary bus.

11. The vehicle of claim 10, wherein during a charging mode in which the charger supplies electricity to the battery or a vehicle to grid mode in which the vehicle supplies electricity to a grid via the charger, the controller is programmed to
    compare a battery charging current against a reference current to determine a current difference,
    compare the voltage across the first capacitor against the voltage second capacitor to determine a voltage difference, and
    determine a phase shift angle based on the current difference and the voltage difference to control the switching of the primary H-bridge switches.

12. The vehicle of claim 11, wherein during a charging mode or the vehicle to grid mode, the controller is programmed to control a duty cycle of each of the charger switches based on the voltage difference.

13. The vehicle of claim 10, wherein during a driving mode in which the battery supplies electricity to an electric machine, the controller is programmed to
- disable the primary H-bridge switches and some of the secondary H-bridge switches,
- compare the voltage across the first capacitor against the voltage across the second capacitor to determine a voltage difference, and
- operate the charger switches and the other of the secondary H-bridge switches based on the voltage difference.

14. A method of operating a vehicle power converter, comprising:
- operating a plurality of switches of the vehicle power converter such that a voltage at an input of the vehicle power converter and a voltage across each of a plurality of series connected capacitors defining an output of the vehicle power converter are same, and a voltage at the output is double the voltage at the input.

15. The method of claim 14, wherein the operating includes toggling some of the switches to transform DC power to AC power.

16. The method of claim 15, wherein the operating includes toggling other of the switches to transform AC power to DC power.

* * * * *